United States Patent
Wolf et al.

(10) Patent No.: US 9,618,939 B2
(45) Date of Patent: Apr. 11, 2017

(54) METHOD FOR CONTROLLING AN AIRCRAFT IN THE FORM OF A MULTICOPTER AND CORRESPONDING CONTROL SYSTEM

(71) Applicant: e-volo GmbH, Karlsruhe (DE)

(72) Inventors: Stephan Wolf, Karlsruhe (DE); Thomas Ruf, Sasbach-Obersasbach (DE)

(73) Assignee: e-volo GmbH, Karlsruhe (DE)

( * ) Notice: Subject to any disclaimer, the term of this patent is extended or adjusted under 35 U.S.C. 154(b) by 0 days.

(21) Appl. No.: 14/402,843

(22) PCT Filed: May 17, 2013

(86) PCT No.: PCT/EP2013/060267
§ 371 (c)(1),
(2) Date: Apr. 9, 2015

(87) PCT Pub. No.: WO2013/174751
PCT Pub. Date: Nov. 28, 2013

(65) Prior Publication Data
US 2015/0212523 A1    Jul. 30, 2015

(30) Foreign Application Priority Data

May 21, 2012  (DE) .......................... 10 2012 009 865

(51) Int. Cl.
*G05D 1/00* (2006.01)
*G05D 1/10* (2006.01)
(Continued)

(52) U.S. Cl.
CPC .............. *G05D 1/101* (2013.01); *B64C 11/46* (2013.01); *B64C 27/08* (2013.01); *B64C 27/57* (2013.01);
(Continued)

(58) Field of Classification Search
CPC ......... B64C 27/08; B64C 11/46; B64C 27/20; B64C 27/57; G05D 1/101
(Continued)

(56) References Cited

U.S. PATENT DOCUMENTS 4,635,195 A * 1/1987 Jeppesen, III ............ G06F 1/28
  370/475
5,134,691 A * 7/1992 Elms ................... G06F 13/4269
  709/209

(Continued)

FOREIGN PATENT DOCUMENTS

| DE | 102005010336 | 5/2006 |
|---|---|---|
| DE | 202012001750 | 5/2012 |
| WO | 2008147484 | 12/2008 |

*Primary Examiner* — Gertrude Arthur Jeanglaude
(74) *Attorney, Agent, or Firm* — Volpe and Koenig, P.C.

(57) ABSTRACT

A method and a system are provided for controlling an aircraft in the form of a multicopter which has a plurality of redundant rotors (4), preferably arranged in a common rotor plane, in order, on the one hand, to generate lift, and, on the other hand, also propulsion by inclining the at least one rotor plane, wherein the regulation of the position and the control of the multicopter are carried out by changing rotor rotational speeds as a function of pilot control instructions. The system is characterized in that the rotors (4) are connected to one another in terms of data technology via a failsafe network (8), and they communicate their respective operating state, in particular their rotor rotational speed, in the network (8), and in that the network contains a first multiplicity of redundant sensors which determine control-relevant data and make it available in the network, in particular inclination, acceleration, rotational speed and/or position in all three spatial axes of the multicopter.

40 Claims, 14 Drawing Sheets

(51) Int. Cl.
    *B64C 27/08*          (2006.01)
    *B64C 27/57*          (2006.01)
    *B64C 11/46*          (2006.01)
    *B64D 45/00*          (2006.01)
    *B64D 47/00*          (2006.01)
    *G05D 1/08*           (2006.01)

(52) U.S. Cl.
    CPC ............. *B64D 45/00* (2013.01); *B64D 47/00* (2013.01); *G05D 1/0088* (2013.01); *G05D 1/0808* (2013.01)

(58) Field of Classification Search
    USPC ............................... 701/2, 3, 4, 5; 244/17.13
    See application file for complete search history.

(56) References Cited

U.S. PATENT DOCUMENTS

2012/0158215 A1    6/2012   Sun et al.
2015/0012154 A1    1/2015   Senkel et al.

\* cited by examiner

·······► Information flux within the network

⎯⎯⎯► Electrical connection

|  | Time T1 | Time T2 | Time T3 | Time T4 |
|---|---|---|---|---|
| Output S1 | 10 | 15 | 18 | 19 |
| Output S2 | 11 | 15 | 18 | 19 |
| Output S3 | 12 | 200 FALSE | 330 FALSE | 440 FALSE |
| Median of Sensor values | 11 | 15 | 18 | 19 |
| Rotary speed output R1 | 300 | 320 | 340 | 350 |
| Rotary speed output R2 | 300 | 320 | 999 FALSE | 111 FALSE |
| Rotary speed output R3 | 300 | 320 | 340 | 350 |
| Median motor speed | 300 | 320 | 340 | 350 |
| DISPLAY | OK | OK | OK | ALARM SENSOR DEFECT |

| Number of values | Number of tolerable errors | Example values | Median |
|---|---|---|---|
| 1 | 0 | 13 | 13 |
| 2 | 0 | 1, 99(f) | 50 |
| 3 | 1 | 1,1,99(f) | 1 |
| 4 | 1 | 1,2,2,99(f) | 2 |
| 4 | 2 | 1(f),50,50,99(f) | 50 |
| 5 | 2 | 1(f),49,50,50,99(f) | 50 |
| 7 | 3 | 1(f),2(f),3(f),49,50,51,51 | 49 |

Fig. 14

METHOD FOR CONTROLLING AN AIRCRAFT IN THE FORM OF A MULTICOPTER AND CORRESPONDING CONTROL SYSTEM

BACKGROUND

The invention relates to a method for controlling an aircraft in the form of a multicopter, which multicopter comprises several, preferably redundant rotors arranged in a common rotor plane, in order to generate lift, on the one hand, and propulsion, on the other hand, by inclining at least one rotor plane, with the adjustment of the position and the control of the multicopter occurring by changing the rotor speeds depending on pilot control instructions.

Additionally, the invention relates to a control system for an aircraft in the form of a multicopter, which multicopter comprises several redundant rotors, preferably arranged in a common rotor plane, in order to generate lift, on the one side, and also propulsion, on the other side, by inclining at least one rotor plane, with the adjustment of the position and the control of the multicopter occurring by changing the rotor speeds depending on pilot control instructions.

Additionally, the invention relates to an aircraft in the form of a multicopter, which multicopter comprises several redundant rotors, preferably arranged in a common rotor plane, including respectively at least one electric motor and one propeller, in order to generate lift, on the one side, and also propulsion, on the other side, by inclining at least one rotor plane in the space, with the adjustment of the position and the control of the multicopter occurring by changing the rotor speeds depending on pilot control instructions.

An aircraft is known from DE 20 2012 001 750 U1 in the form of a vertically starting and landing multicopter, which aircraft can be controlled via a generic method and/or shows a respective generic control system.

A "multicopter" is considered here and in the following an aircraft, which uses several rotors or propellers preferably arranged in a common plane and acting vertically downwards, in order to generate lift and also propulsion, by inclining particularly one rotor plane. A multicopter is considered a rotor aircraft and thus can land and take-off vertically.

Unlike conventional helicopters, multicopters use no mechanical control elements. The rotors and/or propellers exhibit a fixed pitch and are not adjustable, which lowers the production costs and reduces the need for maintenance.

Any changes of the lift occur exclusively by increasing or reducing (changing) the motor speeds at the electric motors used for driving the propellers. Here and in the following "rotor" represents the combination of electric motor and propeller, while "propeller" only refers to the actual airscrew itself.

In a multicopter the rotors move in opposite directions, one half in the clockwise direction, the other half in the counter-clockwise direction. This way the torque about the vertical axis, developing by the propellers upon the support frame of the multicopter, compensate each other when the totals of the forces of the clockwise and/or the counter-clockwise spinning propellers are equivalent.

A rotation of the multicopter about the vertical axis (yaw axis) can be achieved by different rotations of the clockwise and counter-clockwise spinning rotors. For an incline about the pitch axis (pitching) the rotary speeds of the frontal and the rear rotors are varied, for an incline about the longitudinal axis (rolling) the speeds of the rotors located at the left and at the right. By the incline, here propulsion is possible not only in the vertical direction but also in the horizontal one, thus allowing a motion in any arbitrary direction.

Multicopters are aerodynamically instable. A stable flight behavior can only be achieved by a permanent adjustment of the rotary speeds of the individual rotors.

The pilot of the multicopter controls not the rotary speed of the individual motors, but only sets parameters, such as direction of flight, speed, rate of incline or decline, etc. This can occur for example by joysticks, switches, and similar control elements.

In a multicopter used for transporting persons it is mandatory that the entire control operates with utmost reliability. The failure of individual components, e.g., individual sensors, control processors, or motors, may not lead to any risks for maneuverability or to a crash of the multicopter.

Additionally, several unmanned multicopters are known from prior art, for example for model aviation or used as monitoring drones, which typically exhibit a central control, which determines the target rotary speeds for all rotors and forwards them to the respective motor controllers. Any failure of this central adjustment leads quasi mandatorily to a loss of control of the multicopter and to its crash.

In manned aviation it is common to provide critical components in redundant numbers, e.g., in duplicate or triplicate. In this context then mandatorily a superordinate decision maker is provided, the so-called "voter" or "arbiter", which monitors and decides, which of the critical components still operate correctly. This decision maker may represent the pilot him/herself, who for example decides in the event of deviations between the statements of various instruments based on criteria "majority" and "plausibility" and perhaps shuts off or ignores certain components. The decision maker may also be embodied in the form of an electronic unit, which compares the output (the output signals) of the redundant components and renders a decision according to the majority principle.

However, an electronic "voter" itself represents a "single point of failure", because due to its purpose it must be able to ignore or overwrite the output of certain components. Accordingly, in case of a faulty behavior of the "voter" it may occur that correct control pulses are suppressed and instead faulty control pulses are forwarded. Additionally it may occur that the "voter" itself generates faulty pulses, which may endanger the safety of the flight behavior.

Even in case of a triplicate redundancy of the individual control components and a theoretically considered infallible "voter", a multicopter could crash in case of a failure of only two control components. Accordingly in such a solution extremely high requirements are set for the reliability of the components involved, which would lead to respectively increased production, maintenance, and cost expenses.

SUMMARY

The objective of the present invention is to provide a method and a system for a failsafe electronic position adjustment, control, and operation of such a multicopter as reliable as possible.

This objective is attained according a method, a system, and an aircraft having one or more features of the invention. Advantageous further developments are described below and in the claims.

In order to attain the above-stated objective and to avoid the above-discussed problems, in a method of the above-stated type it is suggested within the scope of the present invention that the rotors are connected to each other by data technology in a failsafe network and communicate their respective operating state in said network, particularly their rotor speeds; a first plurality of redundant sensors is included in the network, which determines the control-relevant (sensor) data and renders it available in the network, particularly the incline, acceleration, yaw rate, and/or position in all three spatial axes of the multicopter; furthermore, a second plurality of controls is included in the network, which autonomously and decentralized respectively determines the control signal for at least one rotor each, preferably also based on the rotor operating states, and renders said signal available in the network; the rotors are controlled via control signals such that any flight behavior of the multicopter is essentially equivalent to the specifications of the pilot control instructions. Here, the pilot control instructions not necessarily originate in a human pilot, but may also be generated automatically (e.g., by an autopilot or the like).

Accordingly, in a control system of the type mentioned at the outset it is provided within the scope of the present invention that the rotors are connected to each other by data technology in a failsafe network and are embodied for the purpose to communicate in said network their respective operating state, particularly their rotor speeds; a first plurality of redundant sensors is provided in the network, embodied to determine control-relevant data and to render it available in the network, in particular the incline, acceleration, yaw rate, and/or position in all three spatial axes of the multicopter; furthermore a second plurality of controls is included in the network, which is embodied to determine autonomously and decentralized, based on sensor data, and particularly additionally based on the rotor operating states, respectively one control signal for at least one rotor each and render it available in the network; here it is possible to control the rotors via the control signals such that a flight behavior of the multicopter is essentially equivalent to a specification of the pilot control instruction. Here, the pilot control instruction does not necessarily originate in a human pilot, but may also be generated automatically (e.g. by autopilot or the like).

An aircraft according to the invention is therefore characterized in that it has a control system according to the invention, which preferably is embodied to execute a method according to the invention.

A stable flight behavior is preferably achieved within the scope of the present invention by a control circuit comprising sensors, a control algorithm, and actuators. The control algorithm is executed on at least one appropriately embodied control. The sensors provide actual data, which is processed by the control algorithm and serves for the control to appropriately address the actuators. The sensors measure, e.g., the incline, acceleration, yaw rate, and position in all three (spatial) axes. Here the electric motors of the rotors serve as actuators, with preferably the motors representing brushless direct current motors. Each of the motors itself can be controlled in its rotary speed independent from the others. As already mentioned, the control algorithm is executed on one or more processors, which form the above-mentioned controls or represent components of these controls. Preferably one such processor/control is used for every actuator.

The new solution suggested within the scope of the present invention can therefore operate entirely without any central units. Instead thereof, a decentralized architecture is used, which comprises a plurality of distributed sensors, controls, and actuators. The above-mentioned components are connected to each other via a failsafe network, with said network preferably being embodied with a high degree of redundancy. Within the scope of a respective further development of the invention the same (control) algorithm can be executed on every control and/or network hub and all important decisions are made in a decentralized fashion. This way, the failure of a number of sensors, controls, and/or actuators can be compensated by the overall system and accordingly tolerated. Here, no "voter" is present, except for the physical reality, i.e. gravity and inertia.

This can be shown by the following example and illustrated without restriction thereof: As long as the plurality of the rotors generate lift, a faulty rotor spinning with an insufficient rotor speed, is not capable to disrupt the overall system and risk the flight safety of the multicopter. The missing propulsion is compensated by the other rotors according to the above-stated explanations.

In the following, a few particularly advantageous further developments of the fundamental concept according to the invention are explained explicitly:

Advantageously the suggested system provides, within the scope of a respective further development, many controls, i.e. considerably more than three, preferably one control each per actuator.

Within the scope of another further development the system also comprises "many" redundant sensors and/or "many" redundant actuators, for example 18 electric motors and a respective number of propellers.

As already discussed, the above-stated components are connected to each other by data technology via a failsafe data network. Preferably, here the data exchange occurs via "data flowing everywhere" so that particularly all controls are informed at all times about the status of the individual components within the network and thus can render their decisions appropriately, with preferably every control deciding autonomously.

Within the scope of another further development the system comprises "many" power suppliers, for example in the form of one battery for each motor and control.

Another further development of the system or method according to the invention provides that the output of all sensors is transmitted via the network to all controls. Furthermore it may be provided that every hub of the network (preferably also every control) reports regularly about its overall status, with it particularly being possible to transmit in the network the status signals "OK", "ALARM", or "DEFECT".

A certain further development of the method according to the invention provided in particular that the output is compared, i.e. the output signals of the sensors. This may occur preferably in every control, with them being aware of the output of all sensors within the scope of a certain embodiment of the invention. The selection of the "correct" value, i.e. the value of the respective sensor considered for the execution of the control algorithm, can occur by forming a median, preferably not by calculating an average value, because here any outliers outside a certain range of values are preferably ignored.

Furthermore, it may be provided that in case of severe deviations of the sensor values (outliers) an ALARM-message is issued to the pilot.

A particularly advantageous further development of the method according to the invention provides that the controls each calculate an output (the actuating variable) for several actuators or even for all of them, and preferably also send respective output signals to at least one of the actuators, to all actuators, or also to all network participants.

Furthermore it may be provided that the controls compare their respective output with the output of the other controls. In a further development of this aspect it may also be provided that for the own actuator, i.e. the actuator physically or structurally allocated to a control, the selection of the "correct" value (actuating variable) occurs by forming the median, particularly not (calculating) the average value, from the own output and the output of the other controls.

In this context it may be even provided that no paired, fixed allocation is provided of controls and actuators, but that every actuator, by forming the median, selects and/or determines a respective actuating variable from the output of several controls. In this context it is necessary that the actuator itself is provided with the respective intelligence in order to perform the above-described comparison and the selection, for example by providing an appropriate (micro) processor for the actuator or actuators.

Another further development of the invention provides that in case of severe deviations (outliers) of the output values (actuating variables) an ALARM-message is issued, particularly to the pilot. Such a message may be issued acoustically and/or optically.

In addition to the mere issuance of such an ALARM-message it may optionally be provided that the freedom of action of the pilot is limited by respective control commands within the system, for example the rate of inclining or declining, when an ALARM-message has been issued.

Within the scope of a respective further development of the system according to the invention it comprises a "central" display device, which however acts preferably as a mere receiving terminal and is embodied with at least one redundancy. This central display is also connected to the network and provided with the appropriate knowledge regarding the entire data traffic within the network.

In an appropriate embodiment the display is capable by a comparison of the data to permanently perform plausibility checks, and in case of alarm messages received also displaying said ALARM. In this context the display must be embodied with sufficient "intelligence", for example by providing at least one suitable (micro) processor.

Within the scope of the discussed plausibility checks it may be provided that the display can send to the pilot data and/or status signals only in case of a consistent data status, i.e. when all sensors, controls, and/or actuators transmit data and/or status signals, which are compatible within predetermined limits for a regular flight operation, and thus signaling "green light" for the release of the multicopter for flight operation.

During the flight it may be provided in a respective further development that when an inconsistency is given or when at least one ALARM message has been issued, the display prompts the pilot to land immediately. As already mentioned, the display itself is only a receiving terminal, no "voter" according to prior art. This means that the malfunction of the display itself has generally no influence upon the overall system and/or the flight behavior of the multicopter.

In order to operate the multicopter preferably operating elements are provided for operation by the pilot. As already mentioned, they may be embodied for example as joysticks or control sticks, as switches, and as displays, particularly also comprising a touchscreen function. Preferably all of these operating elements are provided in several versions and embodied redundantly. In case of a joystick this means for example that it comprises several redundant sensors per axis.

According to a preferred embodiment of the invention the output of all operating elements is transmitted to all network components and is here rendered available as a signal to be potentially considered. This way it is possible to decentrally evaluate all operating specifications of the pilot (user input) within the system.

In order to even further increase the operating safety of the aircraft it may be provided that a start and/or lifting off is only possible when a plurality, preferably all components of the system report a regular status signal ("OK") and the entire data situation is consistent, as defined above.

As a typical example for the above-described circumstance reference is made to a decentral control, which "knows" that there are two redundant start buttons. The above-mentioned control also knows the charging status of all batteries as well as the operating state of all other controls. Accordingly it may be provided that the corresponding motor, and thus also all other motors, can only be started when the control and/or the motor detects that both start buttons report the status "start", all controls transmit the status signal "OK", all batteries are charged by at least 80%, and all joystick and switch values are consistent.

With regards to particularly the operating elements joystick/control stick and/or switch, with it here being possible for the pilot to opt for the active joystick, the following further development according to the invention may be provided such: The above-mentioned switch is embodied with triple redundancy, and here the respective joystick is selected for which at least two or even three switches are consistent in their output signals. From this selected joystick then respectively the median per joystick parameter (e.g., left/right or up/down) is selected for control and/or adjustment purposes.

The method of forming the median for selecting values is applied within the scope of certain embodiments of the present invention for the following reason: The median formation filters out in a simple fashion any "outliers" and particularly flawed values. When forming averages, however, particularly in case of few values considered, even a single error can lead to a severe deviation of the average. Example: five values (1, 1, 2, 1, 200 (=false value)); the median is 1, the average is however 41.

In case of a "sufficiently great number" of values (<<100), individual outliers are also "smoothened out" in the average. Additionally or alternatively it is also common, for example to ignore the respective maximum or minimum. Within the scope of the present invention usually a "small" number of values is given, though, for example maximally 18 or even only three or five. The number of values per decision finding process may also vary temporarily, for example due to data loss within the network, which can be detected by determining test sums (for example CRC), when temporarily only three instead of five values are available, for example. The median solves this problem in an elegant fashion and is therefore very error-tolerant; additionally, due to the small numbers of existing values it can be easily calculated, which otherwise would lead in case of a large increase in values to a disadvantage, because the values for forming the median must be arranged in an increasing order, thus must be sorted.

Within the scope of a respective further development of the invention it may be provided that for the formation of the median the definition of median as applicable for cardinally scaled measurements may be used, according to which in case of an even number of values the median is selected as the arithmetic average of the two central elements so that for example for median values 11 and 13 the value 12 results as the median.

The above-discussed joystick or control stick is particularly critical in its treatment, because in a typical multicopter only "few of them" are provided, for example two or maximally three. Accordingly, the sensors in the joystick are preferably embodied with redundancy, for example three sensors per axis. The joystick itself communicates preferably all three sensor values to the network, and the median formation occurs in a respective further development of the invention in a decentralized fashion, connected to the preferably automatic triggering of alarms in case of deviations, as described.

A selection can be made between the individual joysticks by also redundant switches and/or reversers, as also already described above. This way, all individual errors can be tolerated, only double-errors may potentially cause a problem.

Otherwise, the error tolerance, realized within the scope of the invention in an appropriate embodiment, depends on the number of respectively available (sensor) values according to the following table:

| | |
|---|---|
| For one value | Error tolerance 0 |
| For two values | Error tolerance identical to median |
| For three values | Error tolerance 1 |
| For four values | Error tolerance 1 or 2 (depending on the direction of the deviation) |
| For five values | Error tolerance 2 or 3 (depending on the direction of the deviation) |
| For seven values | Error tolerance at least 3 |
| . . . | . . . |

Within the scope of the invention the above-stated explanations are not limited to the joystick, which is only mentioned as an example, but can also be implemented for all operating elements, which yield respective operating parameters.

The network, within the scope of the present invention called failsafe network, can be embodied according to an appropriate further development of the invention with several redundancies.

In general, for the practical embodiment of the network at least three different solutions are suitable: for example the network may include several parallel buses, e.g., three CAN busses. Alternatively several, redundantly embodied networks may be provided, for example three Ethernet networks with one switch or reverser each. A preferred embodiment of the invention provides that the network is embodied as an interlinked network (mesh network). A potential particular embodiment of such a mesh network is a two-dimensional torus, which shows no central element (in the form of a switch or the like). In a 2D-torus the individual network hubs are (theoretically) arranged in the form of an array of lines and columns, with the hubs in each line and/or column being connected to each other from one neighbor to the next. The last hub in each line and/or column is then in turn connected to the first hub of the respective line/column.

For example, this way 25 hubs can be arranged in a grid with five columns and five lines, with during operation quasi an arbitrary number, maximally four, hubs in the same line or column may fail without this interrupting the communication within the network.

Within the scope of a respective embodiment of the network each network hub comprises four connections to neighboring hubs. Within the scope of another further development of the invention based on this it may be provided that from the above-mentioned four connections two of them are used only for input signals and two only for output signals, in order to allow implementing the network in a simple fashion by an optic or electric transmission, which then accordingly provides only unidirectional connections.

Another preferred further development of the invention provides that within the network only data and/or data combined to data packages are forwarded, if their so-called hop count (in particular according to the number of network hubs that have already forwarded an individual data package) has not yet exceeded a predetermined threshold, so that data packages are not endlessly circulating within the network. Additionally or alternatively it may also be provided that such data or data packages, which originate in a presently forwarding hub, are no longer forwarded by this hub. In this context it may be provided that a list of already visited hubs is added to every data package so that a recipient, who is already stated in the above-mentioned list, abstains from forwarding the respective data package.

Another further development of the invention provides that a rate limitation is implemented for each sender (network hub), in order to prevent that the network is overloaded by a particularly active network hub.

In this context it may be provided that the (direct) neighbors of the above-mentioned active hub remember the time and/or number of the most recent n data packages, with n being a predetermined integer. In the event that here a predetermined limit is exceeded, the respective data and/or data packages are discarded and an ALARM status is indicated.

Within the scope of another further development of the invention it may also be provided that certain hubs, this means some or even all of them, act as information collection sites ("data brokers"). This way it can be implemented that not all data packages are immediately forwarded, but that the respective hub collects the corresponding data, such as sensor values, in a table and advantageously forwards it in a regular cycle. This is advantageous in that then a lower number of data packages needs to be forwarded within the network.

Alternatively it may be provided that data incoming at the respective hub is immediately forwarded if it is newer than the data already included in the table. This is discernible e.g., from the time stamp of the data generator.

A particularly advantageous implementation within the scope of the present invention provides that the system and/or aircraft comprises particularly 18 rotors, with each rotor being equipped with a separate electric motor, separate battery, and separate electronic control. Here, nine rotors spin clockwise, while another nine rotors spin counter-clockwise. The above-mentioned system furthermore comprises 18 control units (controls), which are respectively equipped with separate sensors for the decisive flight parameters. The operating elements are here particularly trice redundant joysticks provided with the above-mentioned switches. Furthermore, the exemplary system and/or aircraft comprise a twice redundant central display, and the network is equipped with optic transmission similar to a 2D-torus, which connects all components to each other.

This way a particularly secure and reliable flight operation can be ensured particularly in an aircraft according to DE 20 2012 001 750 U1, with its disclosed content, particularly with regards to the mechanic-constructive design of a multicopter, being included here by way of reference.

BRIEF DESCRIPTION OF THE DRAWINGS

Additional advantageous embodiments of the invention are discernible from the claims, particularly the dependent claims, as well as from the following description of exemplary embodiments based on the drawing.

FIG. 14 shows the error tolerance during the median formation based on a table.

DETAILED DESCRIPTION OF THE PREFERRED EMBODIMENTS

Figure 1:
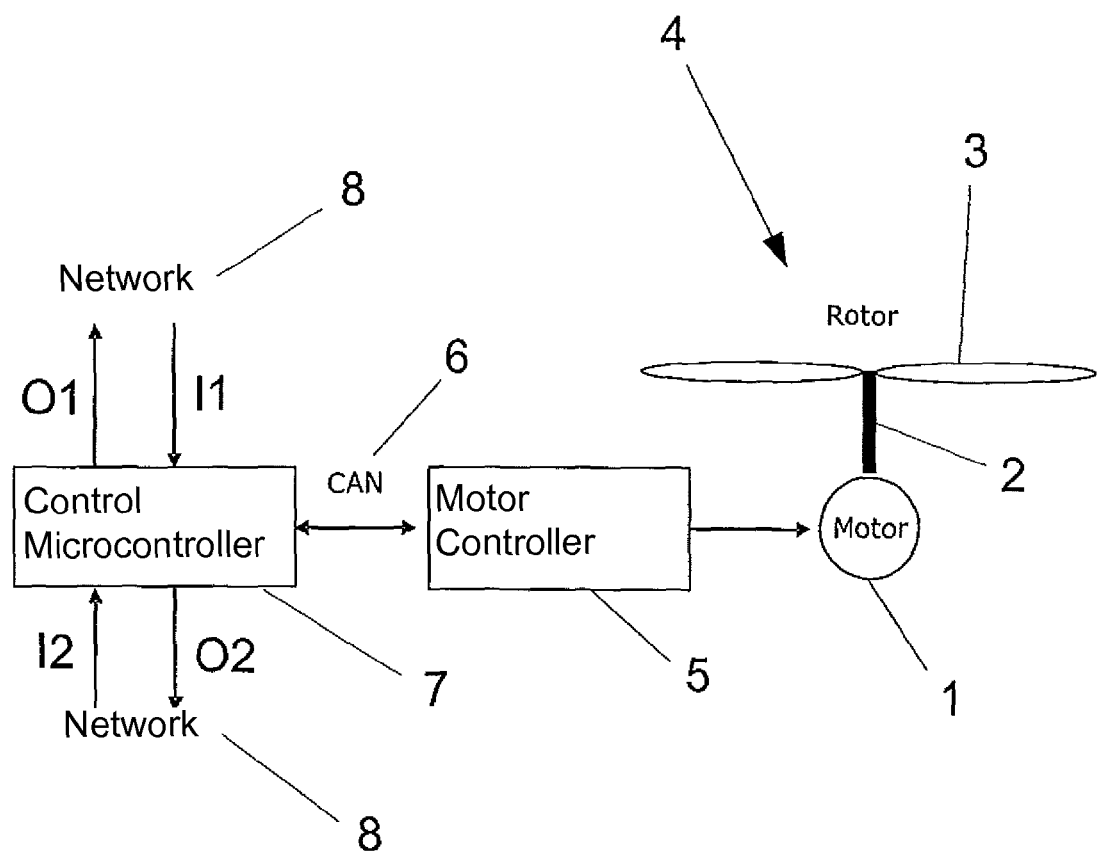
FIG. 1 shows schematically a control with a motor controller, motor, and propeller.

FIG. 1 shows schematically a control with a motor controller for the use in a control system according to the invention for a multicopter, with the latter not being shown explicitly, here. For potential concrete physical-mechanical embodiments of a multicopter reference is made to the above-mentioned DE 20 2012 001 750 U1, particularly with regards to the arrangement of the propellers, the embodiment of the support system, the cockpit, and the like.

In the present case, the reference character 1 indicates as an example the electric motor in the form of a brushless DC-motor, with a propeller 3 being mounted on its shaft (motor axis) 2. According to common understanding of the present application the motor 1 (with the shaft 2) and the propeller 3 form a rotor 4.

A multicopter comprises accordingly several such rotors 4, with the rotors 4 and/or the propellers 3 showing a fixed angle of arrangements, and thus they are not adjustable. This was pointed out in detail in the introductory part of the description. In order to control the multicopter only the respective motor speeds of the motors 1 are changed, which has also already been pointed out above.

According to FIG. 1 the motor 1 is connected to a motor controller 5, which motor controller 5 actuates the motor 1. The motor controller 5 received the respective control data (actuating variables) from a control 7 in the form of a micro-controller via a bus connection 6, in the present case a CAN-bus. The control 7 is connected to a network 8, which in FIG. 1 is symbolized by respective inputs I1, I2 and outputs O1, O2. The control 7 accordingly functions as a network hub and comprises two inputs I1, I2 and two outputs O1, O2. The embodiment of the network 8 is discussed in greater detail in the following.

As already discernible from FIG. 1, the network 8 is designed as a network for unidirectional transmission, i.e. each network connection of the control 7 functions either as an input or as an output.

As already discussed, the control (or the control unit) 7 is embodied as a microcontroller, which accordingly includes a processor unit (CPU) and an appropriate memory unit (RAM) and (ROM), which are not explicitly displayed in FIG. 1 but known per se to one trained in the art. The control 7 may this way be embodied, particularly in a program-controlled fashion, to execute certain control algorithms for actuating the motor controller 5, in order to accordingly influence the motor 1 and thus the motor speeds and/or the speeds of the propeller 3 for the purpose of controlling the multicopter in the manner described.

Figure 2:
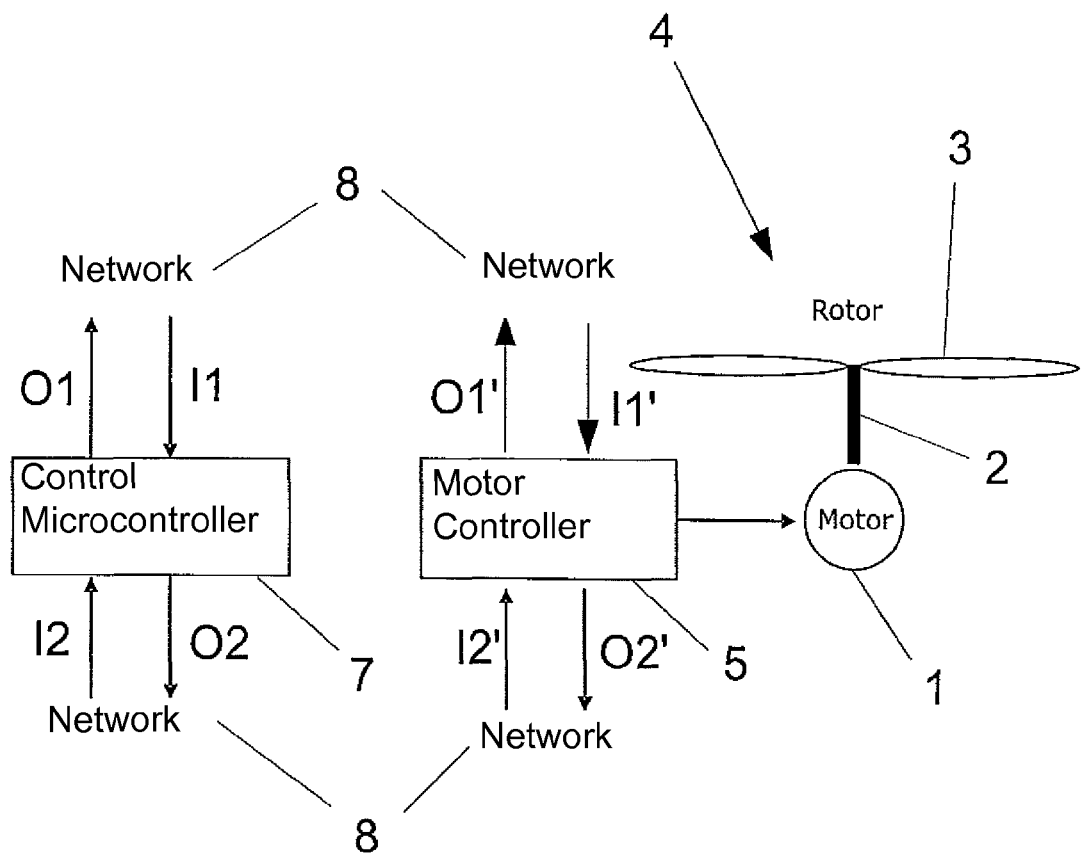
FIG. 2 shows schematically the elements of FIG. 1, with the control and motor controller connected separately to the network.

FIG. 2 shows an alternative arrangement of the elements of FIG. 1, with here and in the following identical or identically functioning elements respectively being marked with the same reference characters.

According to FIG. 2 the controls 7 are arranged separated from the motor controller 5 and respectively connected separately to the network 8. Accordingly, the motor controller 5 shows its own inputs I1', I2' and its own outputs O1', O2'.

The motor controller 5 according to FIG. 2 therefore receives the respective actuating signals concerned in a different fashion than in FIG. 1, not directly by the control 7 via a separated bus connection but via the network 8 from the control 7 shown or from another control within the network 8, which has already been pointed out.

Figure 3:
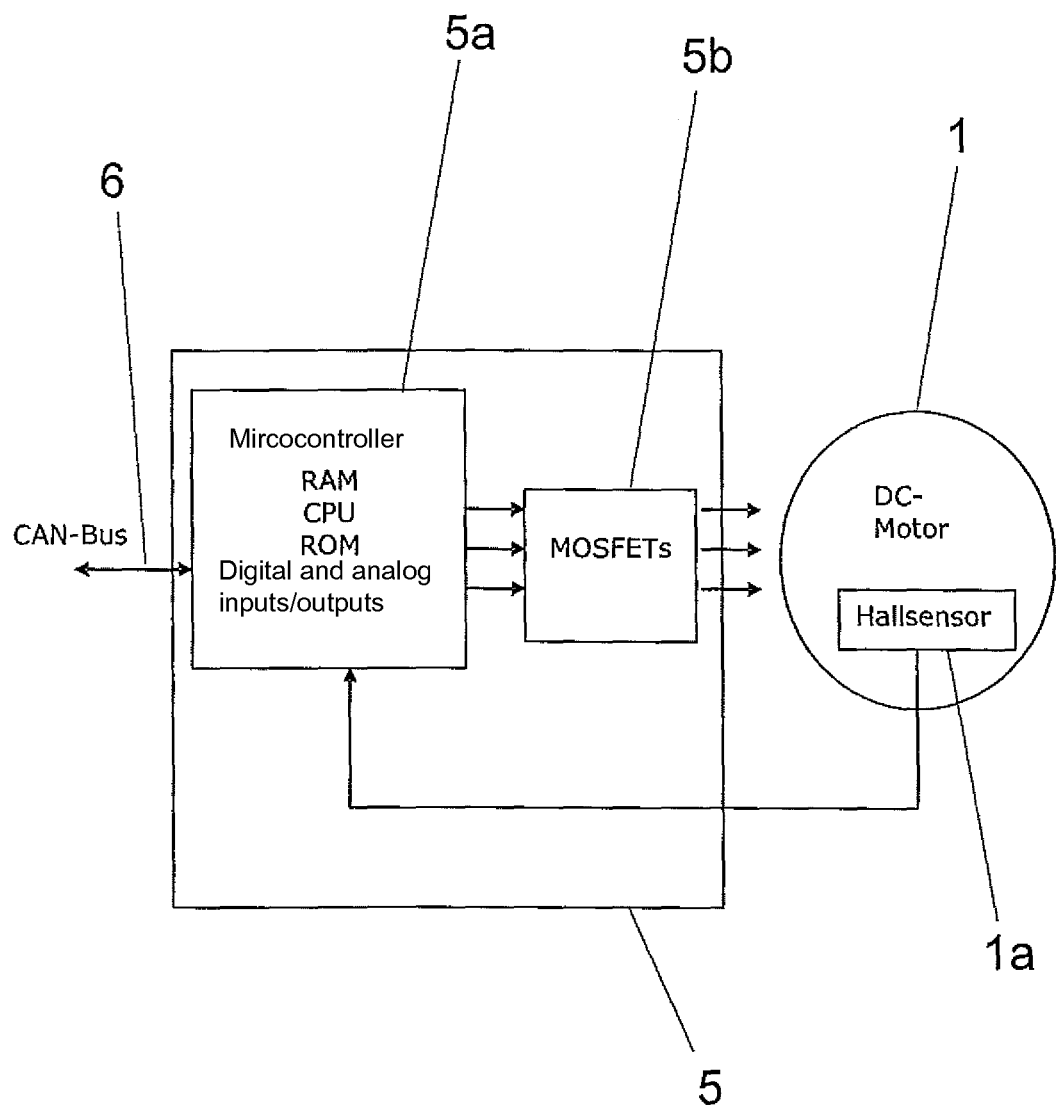
FIG. 3 shows schematically the detailed design of a motor controller, for example of FIG. 1.

FIG. 3 shows once more in detail the exemplary design of a motor controller 5.

The motor 1 is again embodied as a brushless direct current motor and comprises, according to FIG. 3, a sensor, in particular a Hall sensor 1a, for providing information about the rotary speeds. The Hall sensor 1a is connected to a microcontroller 5a included in the motor controller 5, which motor controller 5a furthermore comprises a CPU, RAM, and ROM, as well as digital and analog inputs/outputs, which design is known to one skilled in the art. Additionally the microcontroller 5a comprises a CAN-bus interface (cf. FIG. 1). As discernible for one skilled in the art, the motor controller 5 in FIG. 3 may also be embodied for a use shown in FIG. 2, and comprise the interfaces required, here.

Furthermore, the motor controller 5 also comprises transistors 5b in the form of MOSFETs, which are connected to respective control outputs of the microcontroller 5a and in turn serve to actuate the motor 1 in order to influence its rotary speeds.

Figure 4:
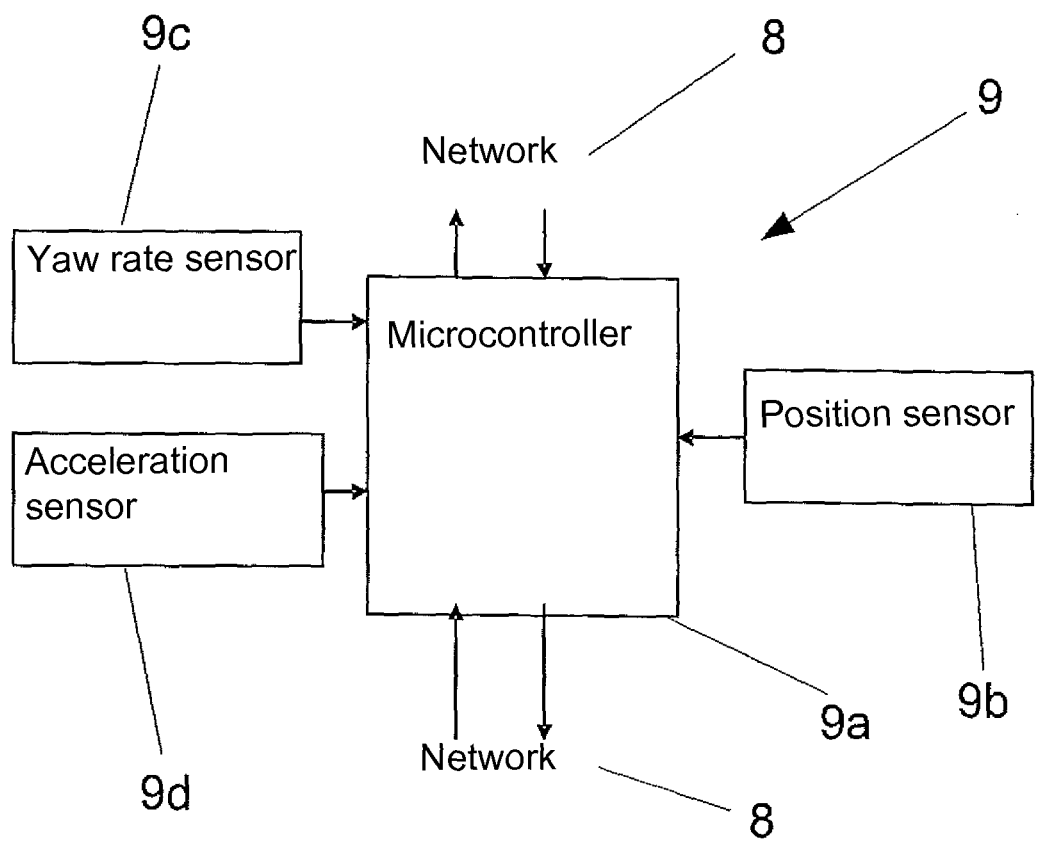
FIG. 4 shows schematically a design of the sensor unit connected to the network.

FIG. 4 shows in detail the design of a sensor unit for a control system according to the invention of a multicopter. In FIG. 4 the sensor unit in its entirety is marked with the reference character 9. It comprises a microcontroller 9a integrated in the network 8 in a design known per se comprising CPU, RAM, and ROM, as well as the necessary network interfaces, which are not explicitly marked in detail in FIG. 4. Furthermore the sensor unit 9 comprises for example three sensors, namely a position sensor 9b, a yaw rate sensor 9c, as well as an acceleration sensor 9d. The connection from and/or to the sensors 9b, 9c, 9d occurs for example via I2C, i.e. a special serial data bus, which is primarily used inside the device for the communication between various parts of the circuit, for example between a controller and peripheral integrated circuits. The sensors 9b-d provide data in three spatial directions (x/y/z-axes)

regarding the yaw rate (sensor 9c), acceleration (9d), and position (sensor 9b), for example via GPS or magnetically like a compass.

Figure 5:
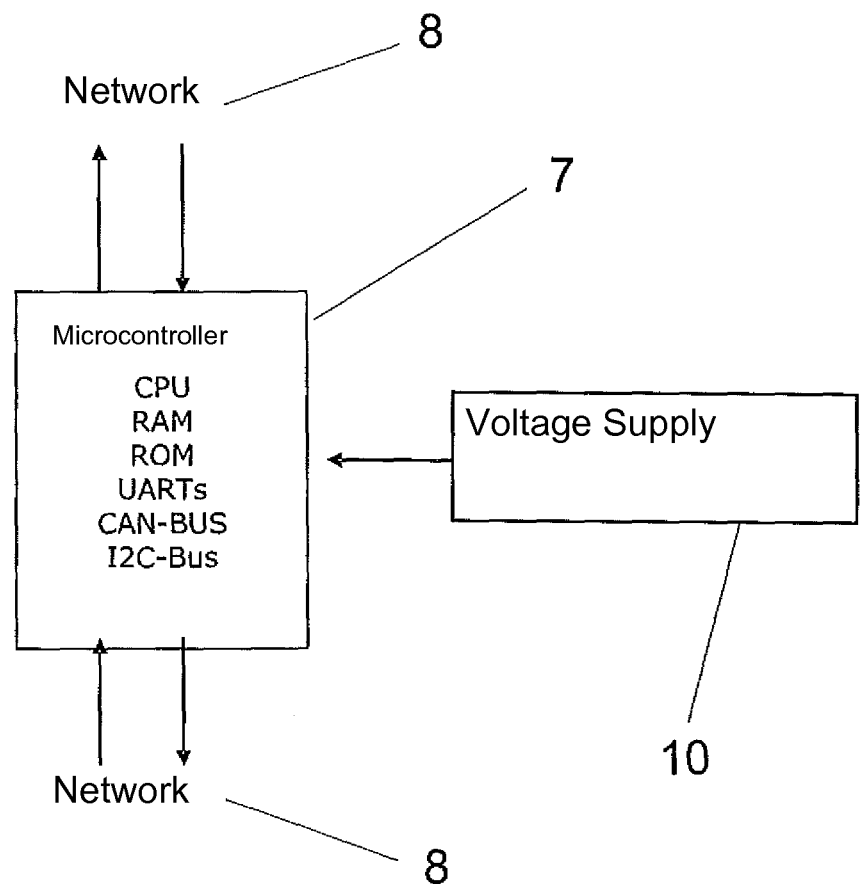
FIG. 5 shows schematically the detailed design of a control.

FIG. 5 shows in detail the design of the control for the control system of a multicopter, for example the control 7 according to FIG. 1 or FIG. 2. As already discussed, the control 7 comprises a microcontroller with CPU, RAM, and ROM. Furthermore, the control 7 and/or the microcontroller also comprise digital serial interfaces, which may be realized via electronic circuits in the form of UART (universal asynchronous receiver transmitter). For this purpose, the above-mentioned CAN-bus and/or a IC2-bus are also included, particularly for communicating with the sensor units 9 according to FIG. 4.

A voltage supply for the control 7 is also shown in FIG. 5, at the reference character 10, which is preferably embodied in the form of a battery. Advantageously, a separate power and/or voltage supply 10 is provided for each arrangement comprising control 7, motor controller 5, and motor 1.

Figure 6:
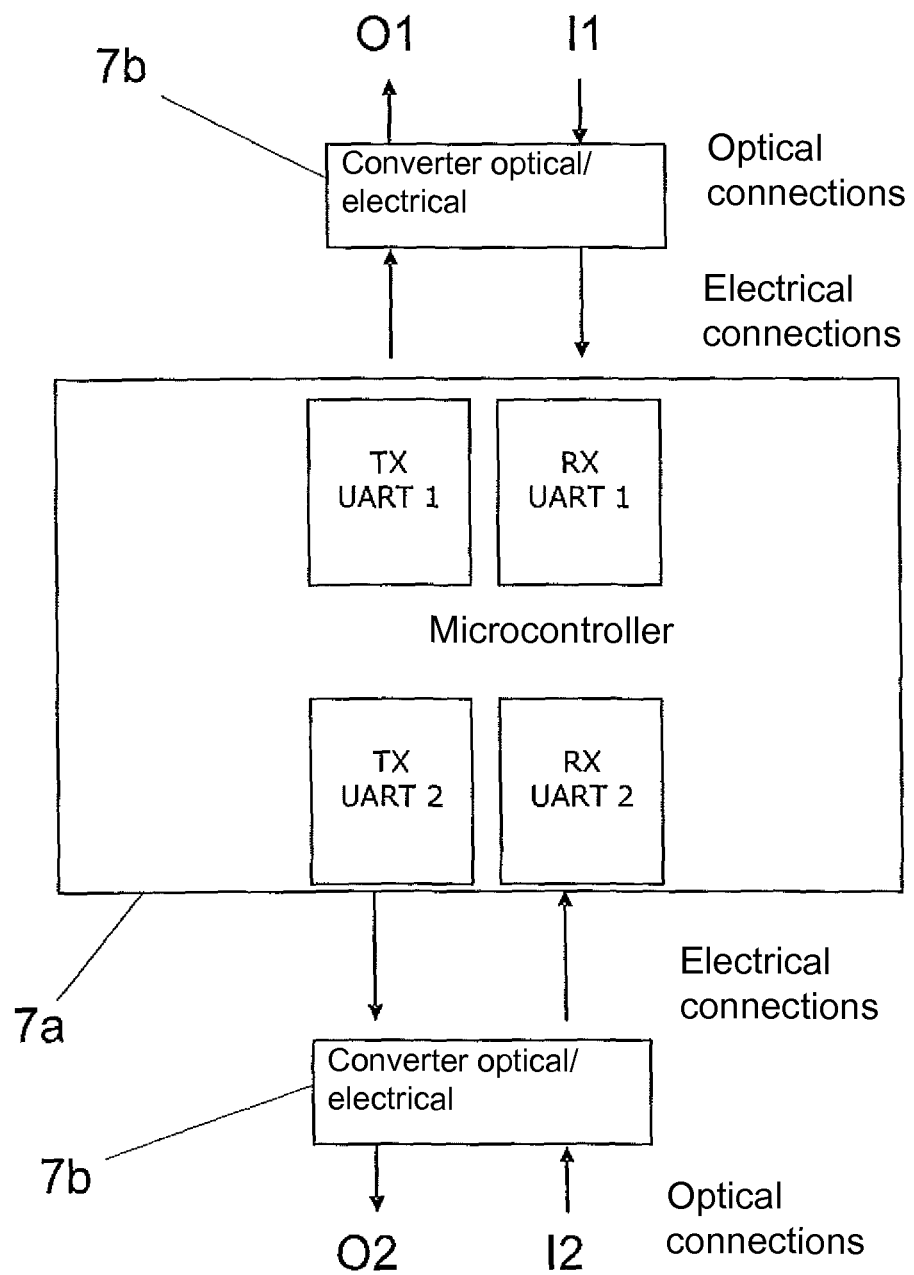
FIG. 6 shows schematically the network interfaces in a control and/or micro-controller connected to the network.

FIG. 6 once more discusses in greater detail the above-mentioned network interfaces with a microcontroller, for example the microcontroller of the control 7 according to FIG. 5.

In FIG. 6 the above-discussed microcontroller is explicitly marked with the reference character 7a. It comprises the above-mentioned UART-circuits, with here it being differentiated between transmitting (TX) and receiving (RX). Accordingly the above-mentioned circuits are marked TX-UART 1/2 and RX-UART 1/2, respectively comprising the inputs/outputs I1, I2 and/or O1, O2 marked in FIG. 1 or 2.

According to FIG. 6 the microcontroller 7a shown is embodied particularly for the connection to an optic network and accordingly also comprises respective optic-electric converters 7b in the area of the network interfaces, in order to convert electric signals generated by the microcontroller 7a into optic signal and vice versa.

Figure 7:
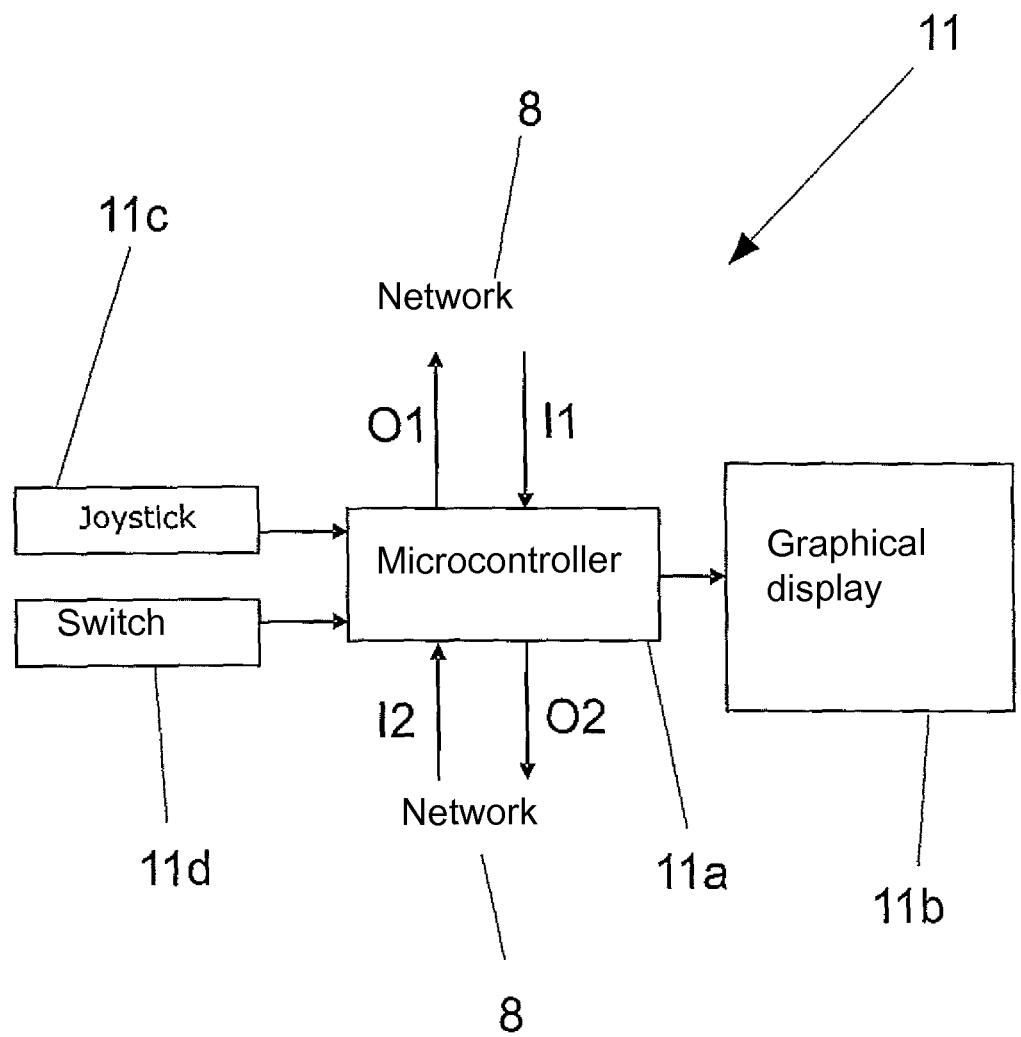
FIG. 7 shows schematically the design of an operating unit with a display.

FIG. 7 shows an operating unit for the use in the control system of a multicopter, with said operating unit overall being marked with the reference character 11. According to FIG. 7 the operating unit 11 comprises a separate microcontroller 11a with CPU, RAM, and ROM, and again four network connections I1, I2 and/or O1, O2. The microcontroller 11a is effectively connected with regards to signal technology to a graphic display 11b, in order to address it. The display 11b can also include operating functions, for example like a touchscreen, however in general it only functions as a receiving terminal in order to display to the pilot for example an operating state of the multicopter.

Furthermore, the microcontroller 11b is also connected with regards to signal technology to a control stick (joystick) 11c and a switch 11d so that it can receive respective input from the joystick 11c and the switch 11d.

As already discernible from reading the introductory part of the description, the operating unit 11 is not limited in any way to the concrete embodiment shown here. In particular, several joysticks 11c and several switches 11d may be connected to the microcontroller 11a in order to select an active joystick by an appropriate activation of the switches.

Figure 8:
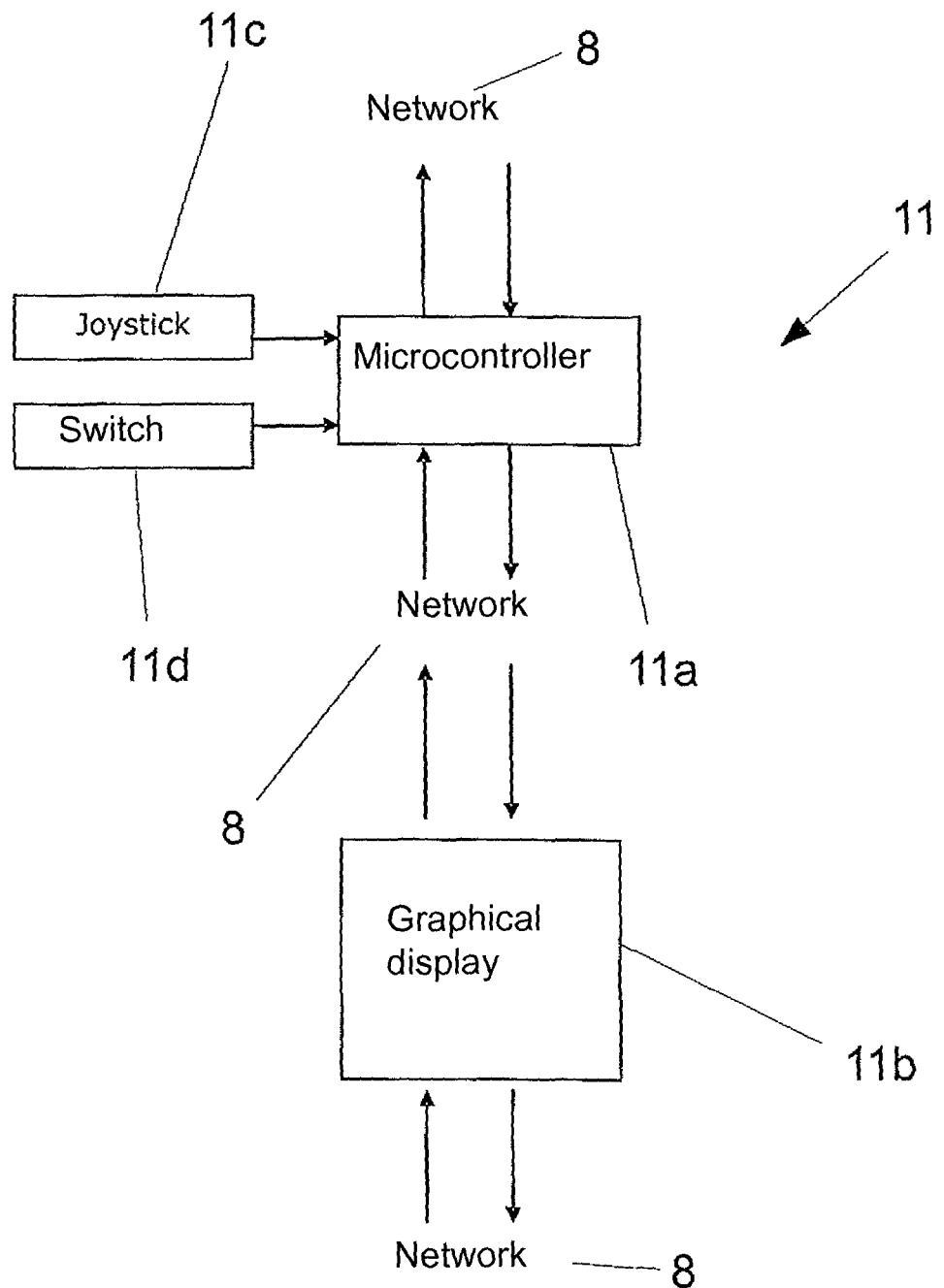
FIG. 8 shows schematically the design of an operating unit without a display.

FIG. 8 shows an alternative embodiment of the operating unit 11, in which the display 11b is not directly connected to the microcontroller 11a, but is only effectively connected to the microcontroller 11a "indirectly" via the network 8. Otherwise, reference is made to the explanations regarding FIG. 7.

Figure 9:
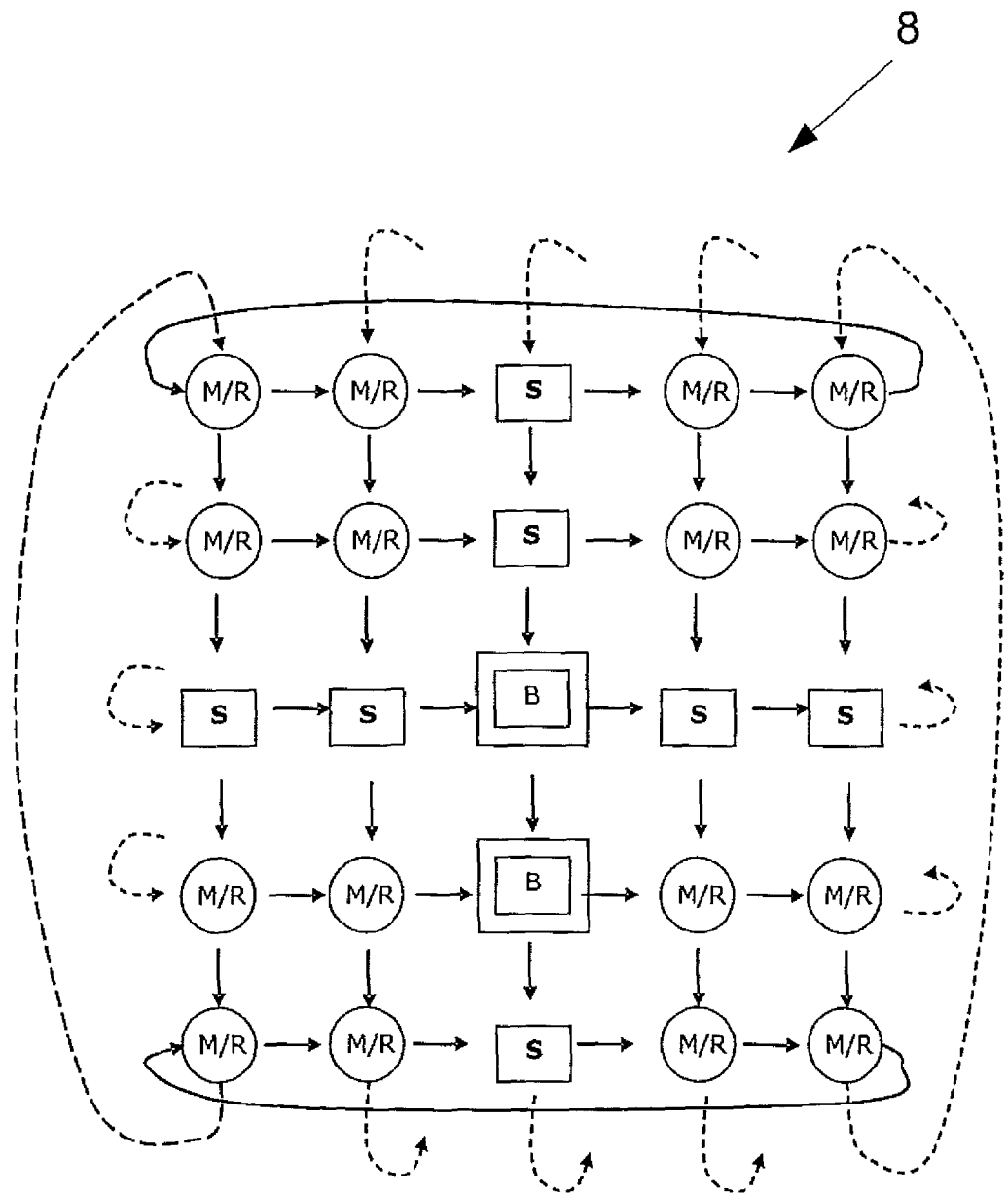
FIG. 9 shows schematically the design of the network in the form of a 2D-torus with a multicopter with 16 rotors and 16 controls.

FIG. 9 shows a potential configuration of the network 8 and the principle arrangement of the logical elements provided therein (network hubs) based on a control system for a multicopter with 16 rotors and controls.

The units comprising motors and controls, for example see FIG. 1, are marked with "M/R" in FIG. 9 and require no detailed identification. The letter "S" marks seven sensor units, the letter "B" represents two operating units; all of the above-mentioned units (M/R, B, S) are connected in a network 8 like a unidirectional 2D-torus, with each of the network hubs M/R, B, S comprising two signal inputs and two signal outputs. The overall 25 network hubs are (theoretically) arranged in the form of a 5×5 matrix, which accordingly comprise five lines and five columns. Within each line, every network hub is connected from the left to the right with its respectively next neighbor, with the last hub of each line being connected to the first hub of the respective line. The same applies accordingly for each column, as shown in FIG. 9. The network 8 developing is particularly failsafe, due to the plurality and redundant signal connections, which has already been pointed out.

As already mentioned, in the embodiment of FIG. 9 the units "M/R" are embodied preferably according to the illustration in FIG. 1. The sensor units "S" may be embodied according to the illustration in FIG. 4. Furthermore, the operating units "B" may particularly be embodied according to FIG. 7. Of course it is also possible to separate the actual operating unit from the displays, see FIG. 8. With regards to the other network hubs, the embodiment according to FIG. 9 is not limited to the embodiments according to the above-described FIGS. 1 to 8.

Figure 10:
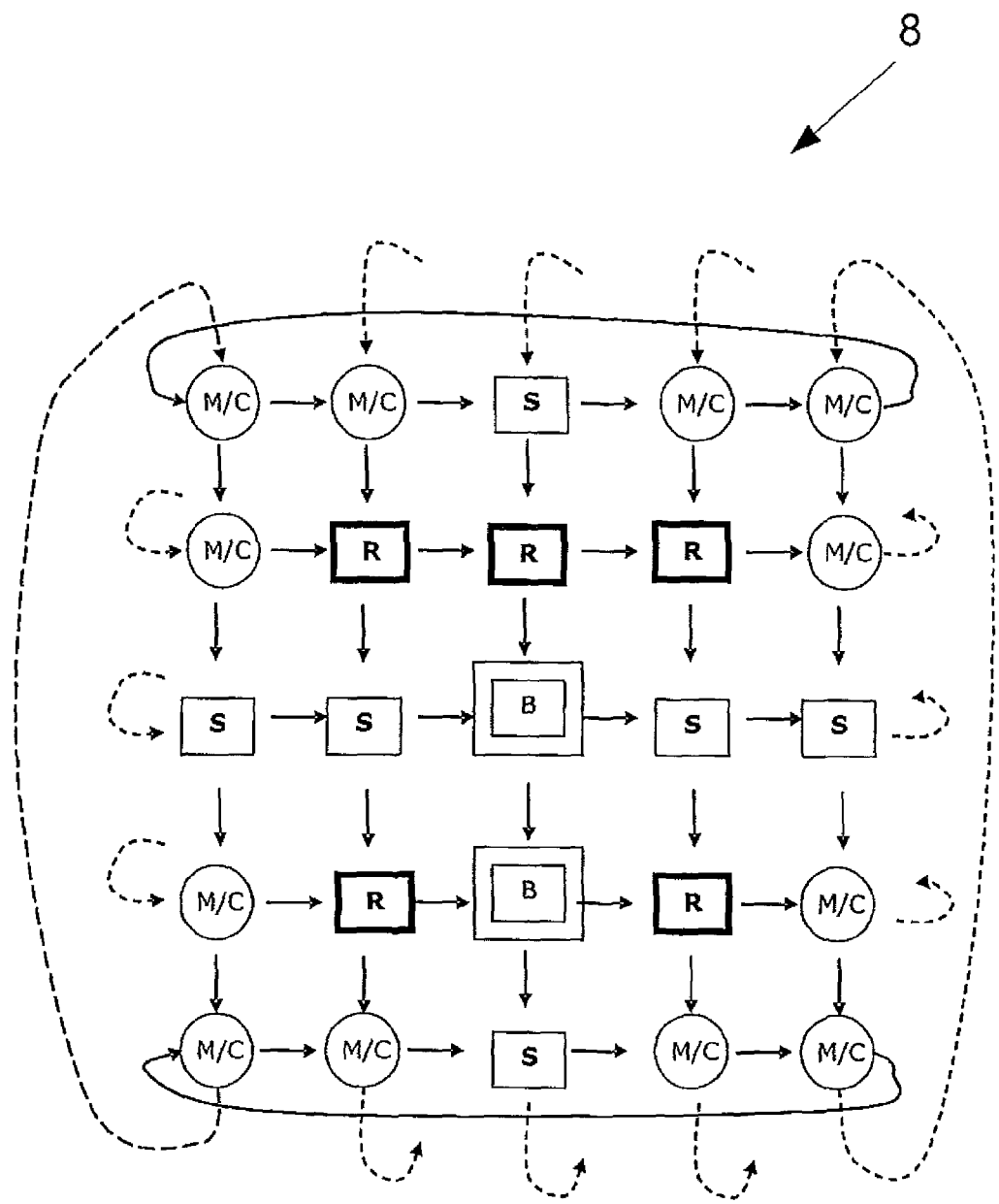
FIG. 10 shows a network similar to FIG. 9, however for a multicopter with twelve rotors and five controls.

FIG. 10 shows an alternative embodiment of the network 8, comprising twelve units of motors and corresponding motor controls, which are marked "M/C" in FIG. 10, which may be equivalent to the embodiment in the right part of FIG. 2. The controls are here separated therefrom and marked with "R" in FIG. 10. The arrangement according to FIG. 10 comprises five such controls R.

Furthermore, the embodiment according to FIG. 10 also comprises two operating units, which once more are marked "B", as well as six sensor units "S". The arrangement overall occurs once more like a 2D-torus.

As easily discernible for one skilled in the art the present invention is not limited in any way to the exemplarily described embodiments according to FIGS. 9 and 10, particularly with regards to the number of motors, controls, sensors, and operating units.

Figure 11:
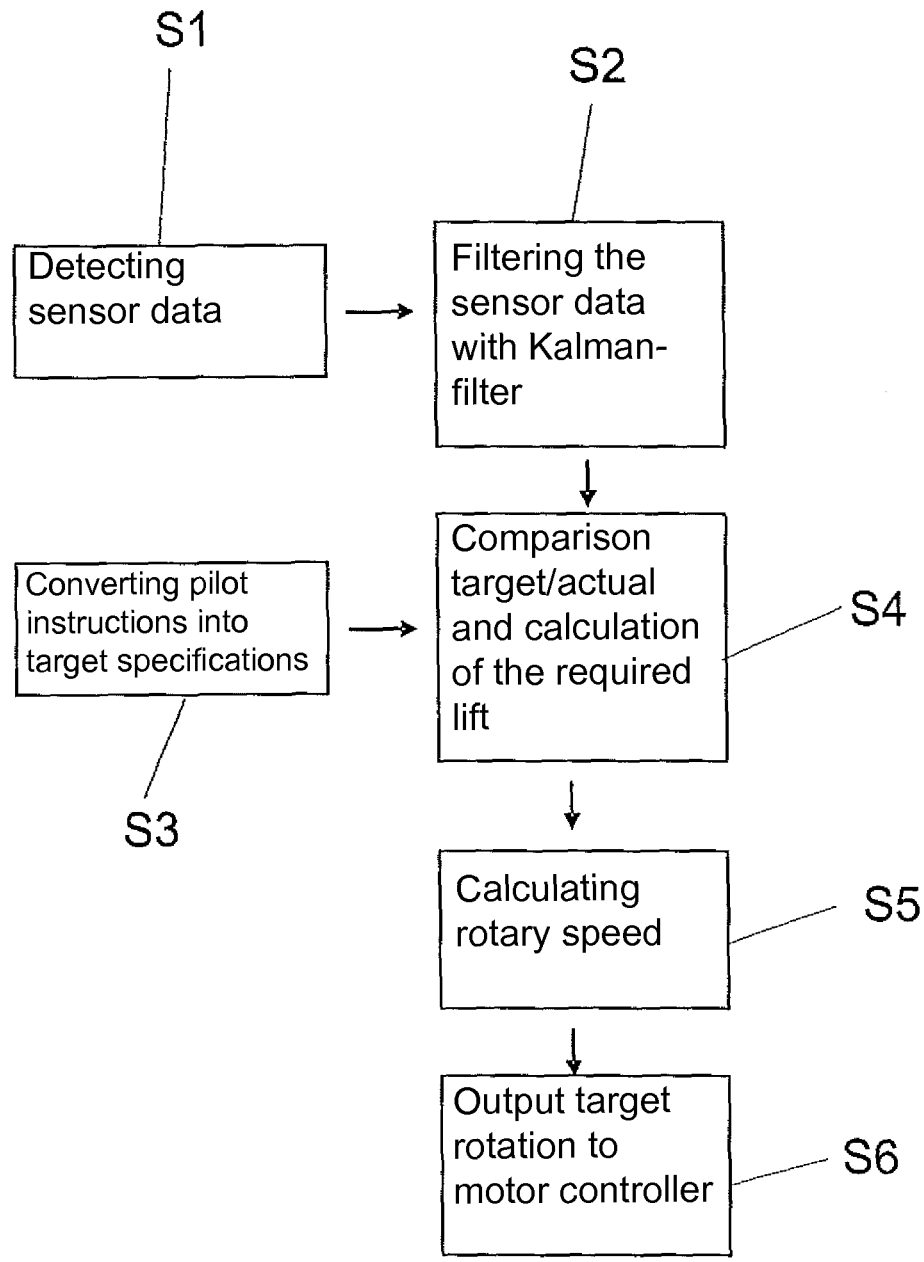
FIG. 11 shows essential elements of a control algorithm for a multicopter in the form of a flow chart.

FIG. 11 shows essential elements of a control algorithm in the form of a flow chart, as preferably executed in every control of the control system according to the invention, see reference characters 7 and/or R in the above-explained figures.

Essential elements of the discussed control algorithm include the detection of the sensor data in step S1, which sensor data subsequently being subjected to filtration in step S2, for example using the Kalman filter mentioned here as an example. This and other suitable filtration methods are known to one trained in the art. In another processing step S3 the conversion of the pilot control instructions, entered by a pilot, occurs via the operating elements into the respective target specifications, which target specifications in step S4 being compared within the scope of a target-actual comparison with the filtered sensor data of Step S2. Furthermore, in step S4 a calculation of the required lift occurs. Subsequently, in step S5 the calculation of the rotary speed occurs for a corresponding rotor or, within the scope of an appropriate further development, for several or all existing rotors. Subsequently, in step S6 the target rotary speed is issued like an actuating variable to the respective motor controller or controllers.

The above-mentioned target specifications particularly include the desired flight speed, flight height, and flight direction. The control itself can occur with the use of standard processes known, for example using digital PID-controls.

Figure 12:
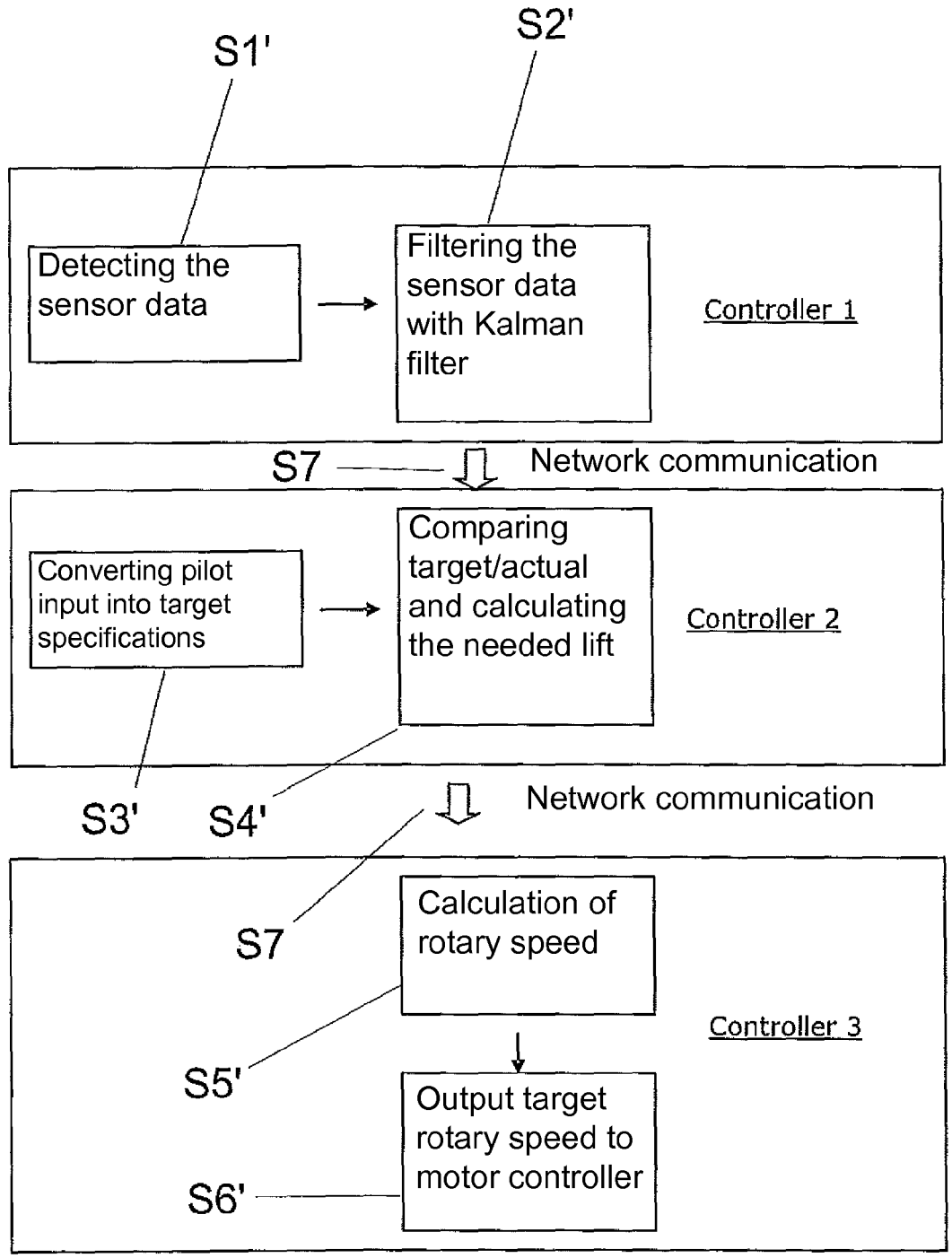
FIG. 12 shows the essential elements of a control algorithm for a multicopter in the case of a decentralized realization.

FIG. 12 shows, based on a flow chart, an alternative, decentralized control algorithm and/or its essential elements as an example for a decentral realization. Here, a "controller 1" shows the sensor data in step S1' and performs in step S2' the filtration explained based on FIG. 11. The sensor data filtered out of it is forwarded at the reference character S via network communication to a "controller 2", which in step S3' and/or S4' is responsible for the above-described conversion of the pilot control instruction into target specifications and the target-actual comparison for the purpose of calculating the required lift. The data resulting therefrom is forwarded via additional network communication S7 to a "controller 3", which then in step S5' performs the calculation of the rotary speed and in step S6' performs the issuance of the target rotary speed to the motor controller or controllers.

Figure 13:
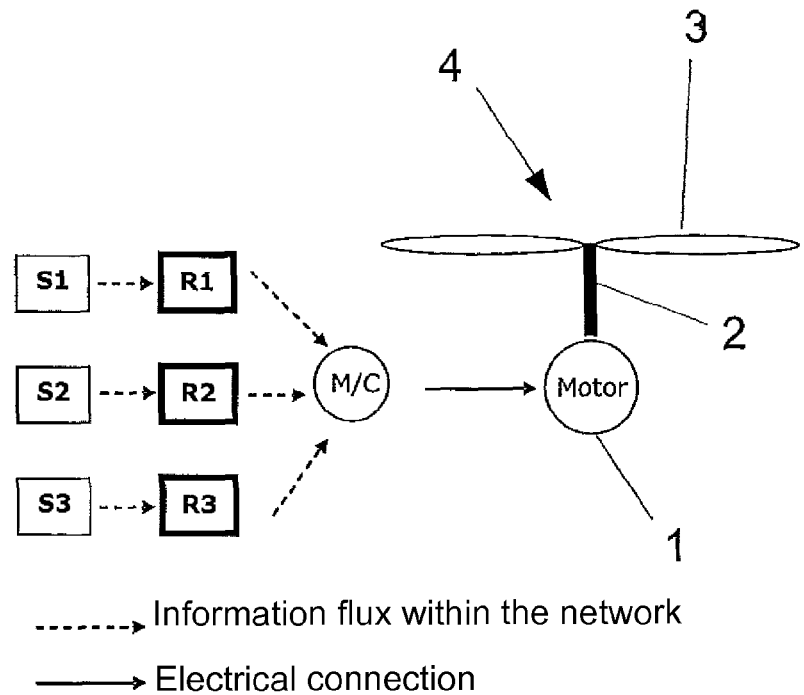
FIG. 13 shows schematically an example for a median formation in a subset of sensors and controls.

FIG. 13 shows schematically the formation of the median in a subset of sensors and controls, with in the upper section of FIG. 13 three sensors S1, S2, S3 and three controls R1, R2, R3 being shown. Furthermore a motor controller M/R is shown. The dot-dash arrows mark only the flow of information within the network, not necessarily the direct technical signal connection. The continuously marked arrow symbolizes the electric connection between the motor controller M/C and the motor 1. The above-mentioned motor 1 is in turn a part of a rotor 4 and drives via a shaft 2 a propeller 3.

The lower part of FIG. 13 shows in the form of a table respectively a fictitious output of the sensors S1-S3, the median of the respective sensor values, the output of the rotary speeds of the controls R1-R3, the median of the motor speed, as well as an illustration in the display regarding the various points of time T1 to T4.

At the time T1 all three sensors S1-S3 provide a correct value, however slightly varying due to measurement imprecisions. The formation of the median occurs decentralized in all controls R1-R3 with the same result, namely the value 11. All three controls R1-R3 calculate therefrom the same target rotary speed 300 for the motor 1. The motor controller M/C uses the median therefrom, also 300, and accordingly actuates the motor 1.

At the time T2 the sensor S3 is defective and provides a false value (200), which however is within the permitted range of values. By the formation of the median this false value is ignored, however. All three controls R1-R3 calculate 320 as the target rotary speed, and the motor 1 is accordingly actuated.

At the time T3 the control R2 also fails, for example due to an unnoticed RAM-malfunction. The formation of the median of the sensor values yields 18, including in the defective control R2. The calculation of the rotary speed in the controls R1 and R3 results consistently in the value 340. In the control R2 the RAM-error falsifies the value to 999. The motor controller M/C forms the value 340 as the median of the rotary speed, so that the motor 1 can still be correctly actuated.

The central display, cf. for example FIG. 7 or 8, monitors the sensor values and rotary speeds, and checks them for plausibility. Brief deviations are preferably filtered out. However, if the values remain implausible over a certain period of time, i.e. they deviate from the median by more than 15% for more than two successive points of time, an alarm is triggered. In the present example this is reached for the sensor values at the time T4, and at the time T5 (not shown) also for the value of the rotary speed.

Preferably, in the present example the median definition for cardinally scaled parameters is used, according to which in case of an even number of values the median is calculated as the arithmetic average of the two central elements. For example, the values 11 and 13 result in a median value of 12.

In FIG. 14 it is finally shown that the median formation yields a good error tolerance even in a very small number of measurements, with in the table according to FIG. 14 flawed values are marked (f). For example, in case of a number of only seven measurements, here three flawed values can already be tolerated, as illustrated in the last line of the table in FIG. 14.

LIST OF REFERENCE CHARACTERS 1 motor
2 shaft
3 propeller
4 rotor
5 motor controller
6 CAN-bus
7 control, control unit
7a microcontroller
7b optic-electric converter
8 network
9 sensor unit
9b sensor
9c sensor
9d sensor
10 voltage supply, power supply
11 operating unit
11a microcontroller
11b graphic display
11c joystick, operating element
11d switch
M/R motor-control unit
M/C motor controller
B operating unit
R control
R1 control
R2 control
R3 control
S sensor unit
S1 sensor
S2 sensor
S3 sensor
I1 input
I2 input
O1 output
O2 output

The invention claimed is:

1. A method for controlling an aircraft in the form of a multicopter, which comprises redundant rotors arranged in a common rotor plane, in order to generate lift and propulsion by an inclining of at least one rotor plane, with a position control to control the multicopter by changes of rotary speeds of the rotors depending on pilot control instructions, the method comprising:

connecting the rotors to each other in a data-technology fashion via a failsafe network, communicating their respective operating state including a rotary speed;

determining data relevant for the control using a first plurality of redundant sensors included in the network, and making the data available in the network, including at least one of an incline, acceleration, yaw rate, or position in all three spatial axes of the multicopter;

providing a second plurality of controls in the network, and using said second plurality of controls for autonomously and decentrally determining respectively, based on the sensor data, a control signal for at least one of the rotors for each of the second plurality of controls and making the control signal available in the network; and controlling the rotors by the control signals such that a flight behavior of the multicopter is essentially equivalent to specifications from pilot control instructions.

2. The method according to claim 1, wherein the rotors, the controls, and the sensors are electrically supplied by a third plurality of power supply units.

3. The method according to claim 1, wherein at least one of the second plurality is equivalent to a number of the rotors, the third plurality is equivalent to the number of rotors, or the second plurality is equivalent to the third plurality.

4. The method according to claim 1, wherein a data exchange between at least one of the rotors, the controls, or the sensors occurs by way of data distribution in the network.

5. The method according to claim 1, wherein output signals of all of the sensors are transmitted to all of the controls.

6. The method according to claim 1, wherein every network hub in the form of a sensor, control, or rotor in the network regularly transmits a status signal.

7. The method according to claim 1, wherein output signals of the sensors are compared with each other, and a selection occurs of an actual value describing a flight status of the multicopter by way of forming a median.

8. The method according to claim 1, wherein output signals of the sensors are compared with each other, and at least one of a warning signal is generated or a warning message is indicated for the pilot when the sensor values exceed a defined range.

9. The method according to claim 1, wherein at least some of the controls provide a control signal for respectively more than one of the rotors.

10. The method according to claim 1, wherein output signals of the controls are compared with each other and, in case of a distribution of the respective control signals or adjustment parameters beyond a defined range, at least one of a warning signal is generated or a warning message is displayed for the pilot.

11. The method according to claim 1, wherein output signals of the controls are compared with each other and a selection occurs of an actuating variable for a given one of the rotors by forming a median, with no fixed allocation being given between the rotors and the controls.

12. The method according to claim 8, wherein by the warning signal or a signal deducted therefrom a freedom of action of the pilot is automatically limited.

13. The method according to claim 8, wherein at least one of a flight or operating state of the aircraft is indicated to the pilot via at least one display, embodied with single redundancy, with said display receiving all data communicated in the network as a receiving terminal and regularly checks said data for consistency, and in the event of inconsistencies or the presence of a warning signal, or both, the pilot is informed by an appropriate display and prompted to land.

14. The method according to claim 1, wherein redundant operating elements are provided for pilot control instructions, including at least one of switches or joysticks, with their output signals being provided to all units present in the network, including at least one of the sensors, the controls, or the rotors, with a decentralized assessment of the pilot control instructions occurring by the controls.

15. The method according to claim 1, wherein the rotors, the controls, and the sensors are electrically supplied by a third plurality of power supply units, redundant operating elements are provided for pilot control instructions, and a start of the aircraft is only enabled when all units present in the network, including the sensors, the controls, and the rotors report a regular operating state or the data communicated in the network is consistent, which includes at least one of the following conditions:
 a) existing start buttons report a "start"-operating state;
 b) all of the controls report a regular operating state;
 c) all of the power supply units report at least a minimum charging status, for example 80%; or
 d) all operating elements for pilot control instructions provide consistent values.

16. The method according to claim 1, wherein in order to select an active operating element for pilot control instructions, said active operating element is selected from a plurality of redundant operating elements as the active operating element, for which a plurality of respective selection elements show a respective selection status, with most preferably for the selected operating element the median being selected for each operating parameter provided.

17. The method according to claim 1, wherein only data or data packages are forwarded in the network, in which a constantly updated forwarding counter has not exceeded a predetermined threshold or which did not originate in the presently forwarding network participant itself.

18. The method according to claim 1, wherein a rate limitation per sender occurs in the network, with direct neighbors of each of the network participants recording a transmission time and a number of a last n, n=1, 2, 3, . . . , data or data packages of said network participant, and when a threshold is reached, at least one of a warning signal is generated or the respective data or data packages are discarded.

19. The method according to claim 1, wherein in the network data packages are collected and summarized at network hubs, and subsequently forwarded in a regular cycle, or the data incoming at the respective hubs is immediately forwarded, if it is more recent than any of the data already present in the hub.

20. The method according to claim 1, wherein the data transmission in the network occurs optically or electrically.

21. A control system for an aircraft in the form of a multicopter, which comprises several rotors arranged in a common rotor plane, in order to generate lift and propulsion by inclining at least one rotor plane, with a position control and control of the multicopter occurring by changing rotor speeds depending on pilot control instructions,
 the rotors are connected to each other via a failsafe network in a data-technological fashion, and embodied to communicate a respective operating state in the network;
 a first plurality of redundant sensors provided in the network (8) are embodied to determine data relevant for the control and render said data available in the network, including at least one of an incline, an acceleration, a yaw rate, or a position in all three spatial axes of the multicopter;

a second plurality of controls in the network, embodied to determine autonomously and decentrally, based on sensor data and preferably also based on the operating states of the rotors, respectively a control signal for respectively at least one rotor and render it available in the network;

the rotors being adjustable via control signals such that a flight behavior of the multicopter is essentially equivalent to specifications of the pilot control instructions.

22. A system according to claim 21, wherein a third plurality of power supply units is provided for electric supply to the rotors, the controls, and the sensors, with at least one of the second plurality being equivalent to a number of the rotors, the third plurality being equivalent to the number of rotors, the second plurality being equivalent to the third plurality.

23. The system according to claim 21, wherein the network is designed and implemented such that any data exchange between at least one of the rotors, the controls, or the sensors occurs via data distribution in the network.

24. The system according to claim 21, wherein the network is embodied and implemented such that the output signals of all of the sensors are transmitted to all of the controls.

25. The system according to claim 21, wherein every one of the network hubs in the form of the sensor, the controls, or the rotors is embodied and implemented to regularly send a status signal to the network.

26. The system according to claim 21, wherein the controls are embodied to compare output signals of the sensors with each other, and to perform a selection of an actual value describing a flight status of the multicopter by forming a median.

27. The system according to claim 21, wherein the controls are embodied to compare the output signals of the sensors with each other, and in case of a distribution of sensor values beyond a defined range generating at least one of a warning signal or initiating an alarm message for the pilot.

28. The system according to claim 21, wherein at least some of the controls are embodied to provide a control signal for respectively more than one of the rotors.

29. The system according to claim 21, wherein the controls are embodied to compare output signals of the controls with each other, and in case of a distribution of the respective actuating variables beyond a defined range to generate at least one of a warning signal or issue a warning message for the pilot.

30. The system according to claim 21, wherein the controls are embodied to compare output signals of the controls with each other, and perform a selection of an actuating variable for a given on of the rotors by forming a median.

31. The system according to claim 27, further comprising at least one display, embodied at least with single redundancy, which is embodied to indicate to the pilot at least one of a flight or operating state of the aircraft, said display is embodied for the purpose to receive all data communicated in the network as a receiving terminal, to regularly check for consistency, and in case of inconsistencies or the presence of a warning signal to inform the pilot by an appropriate.

32. The system according to claim 21, wherein redundant operating elements are provided for pilot control instructions, and by redundant ones of the operating elements for pilot control instructions, output signals are rendered available to all units present in the network, including at least one of the sensors, the controls, or the rotors, and the controls are embodied to perform a decentralized assessment of the pilot control instructions.

33. The system according to claim 21, wherein in order to select an active operating element for pilot control instructions, a plurality of respective selection elements is provided, from a plurality of redundant operating elements, with the system being embodied to select the operating element as the active operating element, for which a plurality of selection elements indicate a respective selection status.

34. The system according to claim 21, wherein the network is configured such that only data or data packages are forwarded, in which a constantly updated forwarding counter has not exceeded a predetermined threshold or with said data not originating in the presently forwarding network participant, or both.

35. The system according to claim 21, wherein the network is configured such that a rate limitation per transmitter occurs in the network, with direct neighbors of each of the network participants being embodied to record the transmission time and a number of a last n, n=1, 2, 3, . . . data or data packages of said network participants, and upon reaching a threshold, at least one of generating a warning signal or discarding the respective data or data packages.

36. The system according to claim 21, wherein the network is configured such that the data packages are collected and summarized at networks hubs in the network, and subsequently forwarded in a regular cycle, or that data received at the respective hub is immediately forwarded when it is more recent than the data already present in the hub.

37. The system according to claim 21, wherein the network is embodied for optic or electronic data transmission.

38. The system according to claim 21, wherein the network is embodied with multiple redundancies, or in the form of several redundant networks, or as a meshed network without any central element.

39. The system according to claim 36, wherein for each of the hubs within the network respectively three or more connections are provided to neighboring hubs, with a first subset of connections being embodied as inputs and a second subset of connections being embodied as outputs.

40. An aircraft in the form of a multicopter, which comprises several redundant rotors arranged in a common rotor plane, each including respectively at least one electric motor and a propeller, in order to generate lift and propulsion by inclining at least one rotor plane in space, with a position control and control of the multicopter occurring by changes of rotor speeds depending on pilot control instructions, and the multicopter comprises a control system according to claim 21.

* * * * *